(12) United States Patent
Nakagawa

(10) Patent No.: US 7,613,216 B2
(45) Date of Patent: Nov. 3, 2009

(54) LASER FREQUENCY STABILIZING APPARATUS, METHOD AND COMPUTER PROGRAM PRODUCT FOR STABILIZING LASER FREQUENCY

(75) Inventor: Hideyuki Nakagawa, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/987,507

(22) Filed: Nov. 30, 2007

(65) Prior Publication Data
US 2008/0130694 A1 Jun. 5, 2008

(30) Foreign Application Priority Data
Dec. 4, 2006 (JP) ............................. 2006-327218

(51) Int. Cl.
*H01S 3/13* (2006.01)
(52) U.S. Cl. ................. 372/32; 372/29.011; 372/29.02; 372/38.1
(58) Field of Classification Search ................... 372/32, 372/29.011, 29.02
See application file for complete search history.

(56) References Cited

U.S. PATENT DOCUMENTS 6,009,111 A * 12/1999 Corwin et al. ................. 372/32

2007/0008995 A1* 1/2007 Oozeki et al. .......... 372/29.011

FOREIGN PATENT DOCUMENTS

| JP | A-10-163549 | 6/1998 |
| JP | A-2000-261092 | 9/2000 |
| JP | A-2001-274495 | 10/2001 |
| WO | WO 99/04467 A1 | 1/1999 |

* cited by examiner

*Primary Examiner*—Dung T Nguyen
(74) *Attorney, Agent, or Firm*—Oliff & Berridge, PLC

(57) ABSTRACT

A laser frequency stabilizing apparatus stabilizes an oscillation frequency of laser light by varying a resonator length on the basis of a saturated absorption line included in an optical output signal. The optical output signal is obtained by irradiating an absorption cell with the laser light. The laser frequency stabilizing apparatus includes: a light detecting section for detecting the optical output signal; a differential signal detecting section for detecting a differential signal of the optical light signal; an actuator for varying the resonator length; a drive section for driving the actuator; and a control section for controlling the drive section on the basis of the differential signal. The control section determines saturated absorption lines on the basis of an output of the differential signal, selects a specific saturated absorption line on the basis of the number of determined saturated absorption lines and a combination of the determined saturated absorption lines, and stabilizes the oscillation frequency of the laser light at the specific saturated absorption line.

18 Claims, 11 Drawing Sheets

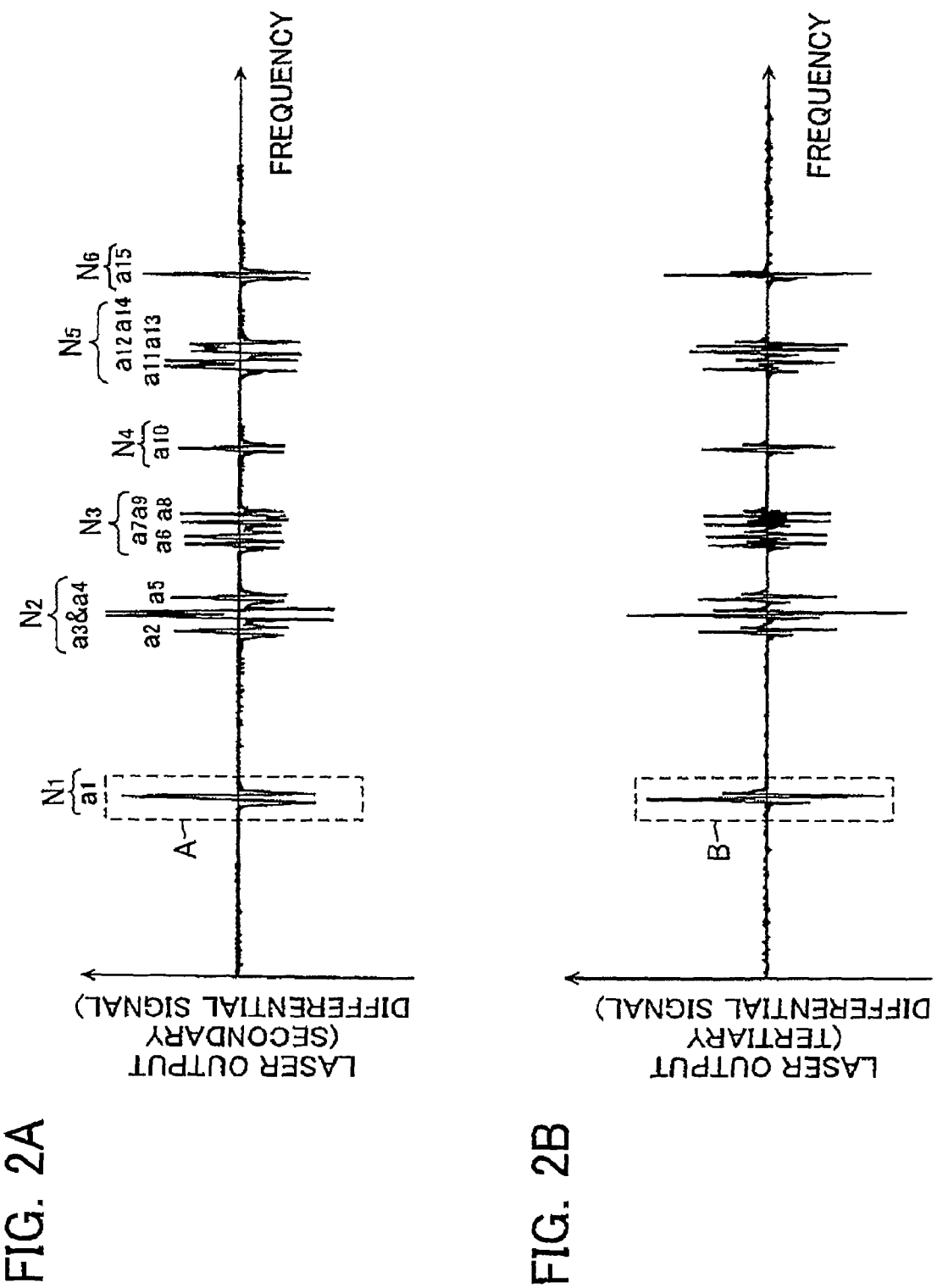

| DESIGNATION | k2 | INCREASE/DECREASE DIRECTION | PREDETERMINED NUMBER OF TIMES |
|---|---|---|---|
| a1 | 2 | DECREASE | 1 |
| a2 | 2 | INCREASE | 1 |
| a3 | 2 | INCREASE | 2 |
| a4 | 3 | DECREASE | 2 |
| a5 | 3 | DECREASE | 1 |
| a6 | 3 | INCREASE | 1 |
| a7 | 3 | INCREASE | 2 |
| a8 | 4 | DECREASE | 2 |
| a9 | 4 | DECREASE | 1 |
| a10 | 5 | DECREASE | 1 |
| a11 | 5 | INCREASE | 1 |
| a12 | 5 | INCREASE | 2 |
| a13 | 6 | DECREASE | 2 |
| a14 | 6 | DECREASE | 1 |
| a15 | 6 | INCREASE | 1 |

LASER FREQUENCY STABILIZING APPARATUS, METHOD AND COMPUTER PROGRAM PRODUCT FOR STABILIZING LASER FREQUENCY

CROSS-REFERENCE TO RELATED APPLICATIONS

This application is based upon and claims the benefit of priority from the prior Japanese Patent Application No. 2006-327218, filed on Dec. 4, 2006, the entire contents of which are incorporated herein by reference.

BACKGROUND OF THE INVENTION

1. Field of the Invention

The present invention relates to a laser frequency stabilizing apparatus, a method and a computer program product for stabilizing a laser frequency by varying a resonator length on the basis of an optical output signal.

2. Description of the Prior Art

A wavelength of a solid laser of a 532 nm range based on continuous wave oscillation can be used as a length standard. In the continuous wave oscillation, an Nd:YAG crystal or the like that can be pumped by a semiconductor laser is used as a gain medium. As a matter of fact, in order to measure a length using a wavelength of laser light, the laser is required to have a single frequency. In other words; the laser light is required to oscillate with a single longitudinal mode. Moreover, in order to stabilize a frequency of the laser light with the use of a spectroscopic technique for atomic or molecular absorption lines, an oscillation frequency must be selected arbitrarily.

When length measurement is carried out using the wavelength of the laser light, there is a need to heighten frequency stability of the laser light in order to reduce uncertainty of length measurement. In an iodine stabilized laser using a spectroscopic technique by absorption lines of iodine molecules, high frequency stability of the laser light can be achieved by controlling an oscillation frequency in the vicinity of the center of a saturated absorption signal (See Patent Document 1: Japanese Patent Application Publication No. 2001-274495, Patent Document 2: Japanese Patent Application Publication No. 10-163549, and Patent Document 3: Japanese Patent Application Publication No. 2000-261092).

A plurality of iodine saturated absorption lines normally exist, and in the iodine stabilized laser, a desired saturated absorption line is to be searched from the plurality of iodine saturated absorption lines to stabilize (or lock) an oscillation frequency.

In consideration of such necessity, the Patent Document 1 discloses a system for identifying a saturated absorption line on the basis of an interval between the saturated absorption lines as a method of automatically stabilizing an oscillation frequency at a desired saturated absorption line.

However, since the system of Patent Document 1 measures an interval between the saturated absorption lines, the system is required to include measuring means capable of measuring the interval between the saturated absorption lines. An instruction value (applied voltage to a piezoelectric element) of an actuator (including the piezoelectric element) may simply be utilized to the measuring means. However, in such a case, the actuator must have sufficient accuracy of linearity relative to interval measuring of the saturated absorption lines. Namely, if the system of Patent Document 1 is utilized, the system is required to have high accuracy for measurement. For this reason, the system is to be expensive and cannot be realized without difficulty. Further, in the case of an apparatus using an actuator having large elapsed-time variation in the system of Patent Document 1, locking (or stabilizing) of an oscillation frequency cannot sufficiently follow the elapsed-time variation.

SUMMARY OF THE INVENTION

In view of the above problem, it is an object of the present invention to provide a laser frequency stabilizing apparatus, a method and a computer program product for stabilizing a laser frequency by which accuracy for measurement of an interval between saturated absorption lines is not required, and stabilizing of an oscillation frequency can follow elapsed-time variation even though an actuator having large elapsed-time variation is utilized.

In order to achieve the above object, an aspect of the present invention is directed to a laser frequency stabilizing apparatus for stabilizing an oscillation frequency of laser light. The laser frequency stabilizing apparatus stabilizes an oscillation frequency of laser light by causing pump light to resonate using a resonator including a pair of mirrors disposed at opposed positions to generate the laser light, and varying a resonator length on the basis of a saturated absorption line included in an optical output signal. In this case, the optical output signal is obtained by irradiating an absorption cell with the laser light. The laser frequency stabilizing apparatus of the present invention includes: a light detecting section for detecting the optical output signal; a differential signal detecting section for detecting a differential signal of the optical light signal; an actuator for varying the resonator length; a drive section for driving the actuator; and a control section for controlling the drive section on the basis of the differential signal. In this case, the control section determines saturated absorption lines on the basis of an output of the differential signal, selects a specific saturated absorption line on the basis of the number of determined saturated absorption lines and a combination of the determined saturated absorption lines, and stabilizes the oscillation frequency of the laser light at the specific saturated absorption line.

Since the laser frequency stabilizing apparatus has the configuration described above, the laser frequency stabilizing apparatus may have accuracy for measurement so as to be capable of identifying the number of saturated absorption lines. Thus, the laser frequency stabilizing apparatus can easily be achieved and manufactured at a low cost. In addition, since the laser frequency stabilizing apparatus has the configuration described above, it is possible to stabilize the oscillation frequency by sufficiently following the elapsed-time variation.

It is preferable that the control section detects the combination of the saturated absorption lines by determining a saturated absorption line group so that adjacent saturated absorption lines are included in the same saturated absorption line group in the case where a difference between control voltage values of the drive section for obtaining the adjacent saturated absorption lines is within a threshold value.

It is preferable that the control section selects any one of the saturated absorption lines included in the combination of the saturated absorption lines in the vicinity of a center voltage value of the actuator as the specific saturated absorption line. Since the laser frequency stabilizing apparatus has the configuration described above, it is possible to select the specific saturated absorption line without specifying the mode hopping. In addition, since the specific saturated absorption line is selected in the vicinity of the center voltage of the actuator, it becomes robust against temperature variation.

It is preferable that the actuator uses a piezoelectric element.

It is preferable that the saturated absorption lines are based on iodine molecules.

It is preferable that the differential signal is a secondary differential signal or a tertiary differential signal of the optical output signal.

Further, another aspect of the present invention is directed to a method of stabilizing an oscillation frequency of laser light by causing pump light to resonate using a resonator including a pair of mirrors disposed at opposed positions to generate the laser light, and varying a resonator length on the basis of a saturated absorption line included in a differential signal of an optical output signal. In this case, the optical output signal is obtained by irradiating an absorption cell with the laser light. The method of the present invention includes: determining saturated absorption lines on the basis of an output of the differential signal; selecting a specific saturated absorption line on the basis of the number of determined saturated absorption lines and a combination of the determined saturated absorption lines; and stabilizing the oscillation frequency of the laser light at the specific saturated absorption line.

Moreover, still another aspect of the present invention is directed to a computer program product for stabilizing an oscillation frequency of laser light by causing pump light to resonate using a resonator including a pair of mirrors disposed at opposed positions to generate the laser light, and varying a resonator length on the basis of a saturated absorption line included in a differential signal of an optical output signal. In this case, the optical output signal is obtained by irradiating an absorption cell with the laser light. The computer program product of the present invention causes a computer to execute: determining saturated absorption lines on the basis of an output of the differential signal; selecting a specific saturated absorption line on the basis of the number of determined saturated absorption lines and a combination of the determined saturated absorption lines; and stabilizing the oscillation frequency of the laser light at the specific saturated absorption line.

BRIEF DESCRIPTION OF THE DRAWINGS

The above and other objects, features and advantages of the present invention will become apparent from the following description of the preferred embodiments in conjunction with the accompanying drawings, wherein:

FIG. 2A is a diagram that shows a secondary differential signal detected when the laser frequency stabilizing apparatus according to the first embodiment of the present invention is controlled;

FIG. 2B is a diagram that shows a tertiary differential signal detected when the laser frequency stabilizing apparatus according to the first embodiment of the present invention is controlled;

DETAILED DESCRIPTION OF THE INVENTION

A laser frequency stabilizing apparatus, a method and a computer program product for stabilizing a laser frequency according to preferred embodiments of the present invention will now be described with reference to the accompanying drawings.

FIRST EMBODIMENT

A configuration of the laser frequency stabilizing apparatus according to a first embodiment of the present invention will be described.

(Configuration of Laser Frequency Stabilizing Apparatus)

Figure 1:
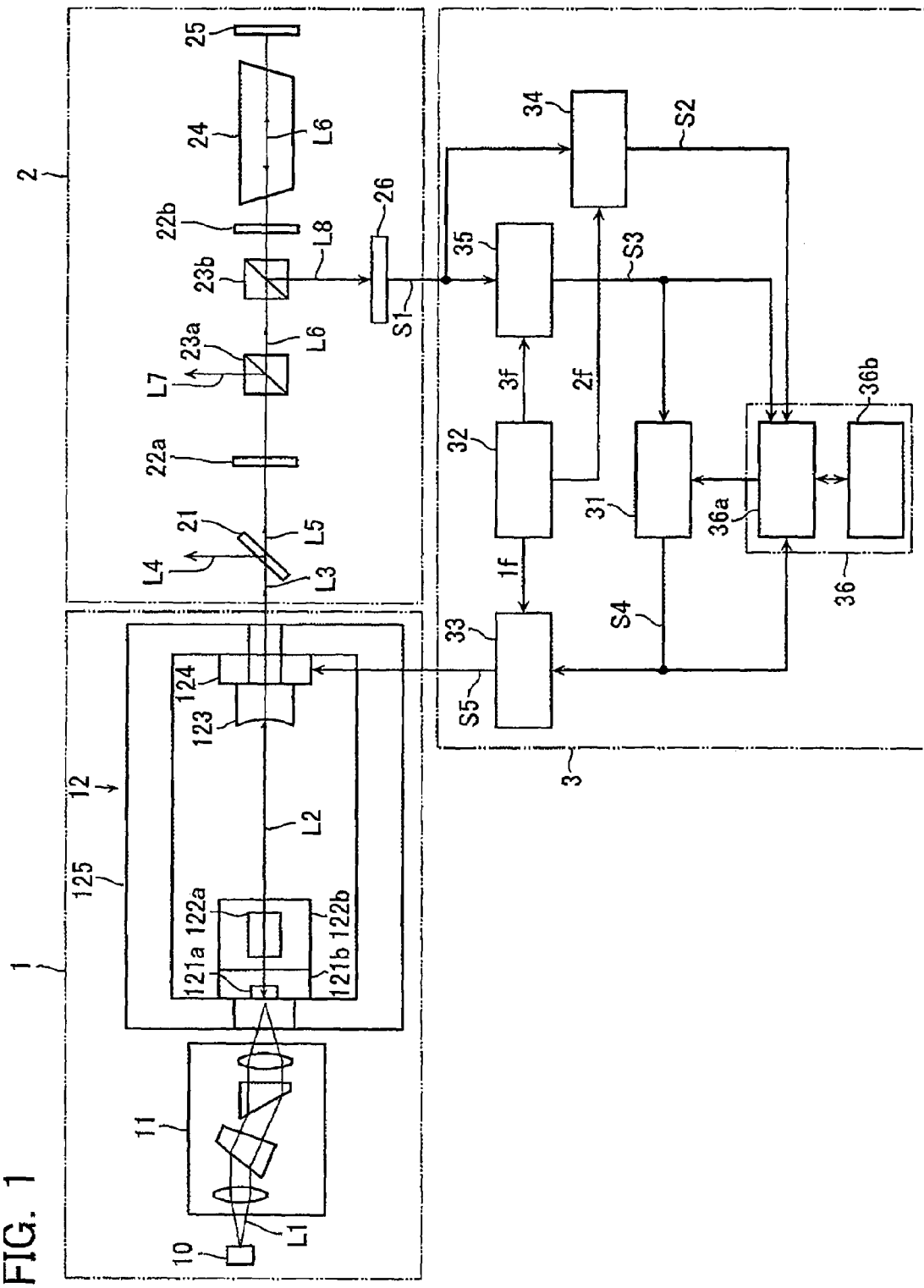
FIG. 1 is a schematic diagram that shows a configuration of a laser frequency stabilizing apparatus according to a first embodiment of the present invention.

FIG. 1 is a schematic diagram that shows the configuration of the laser frequency stabilizing apparatus according to the first embodiment of the present invention. As shown in FIG. 1, the laser frequency stabilizing apparatus includes a laser generating section 1, a laser light detecting section 2 and a drive control section 3.

The laser generating section 1 includes: a pump semiconductor laser 10; a condensing system 11 configured from a plurality of optical elements; and a resonant wave generating section 12.

In the laser generating section 1, when a predetermined current is supplied to the pump semiconductor laser 10, laser light L1 with a wavelength of 808 nm is emitted. The emitted laser light L1 is condensed by the condensing system 11, and is guided to the resonant wave generating section 12.

Nd:YVO4 crystal 121a and KTP crystal (nonlinear optical crystal) 122a are disposed at a laser light input side of the resonant wave generating section 12 (that is, at the left side of the resonant wave generating section 12 in FIG. 1).

The Nd:YVO4 crystal 121a is a diode laser pumped solid. Nd atoms are excited in response to radiation with the laser light L1, whereby light with a wavelength of 1064 nm is emitted due to stimulated radiation. Further, a surface of the Nd:YVO4 crystal 121a, which is opposed to the condensing system 11, is coated to reflect the light with the wavelength of 1064 nm.

The KTP crystal 122a is nonlinear optical crystal so as to convert part of the light with the wavelength of 1064 nm into light with the wavelength of 532 nm, which is a second-order harmonic wave, by stimulated radiation. Here, when the light with the wavelength of the 1064 nm is single longitudinal mode light, the light with the wavelength of 532 nm that is the second-order harmonic wave is single longitudinal mode light.

These Nd:YVO4 crystal 121a and KTP crystal 122a are respectively attached to a Nd:YVO4 crystal holder 121b and a KTP crystal holder 122b, which are made of brass having a relatively large coefficient of liner expansion.

A reflecting mirror 123 and an actuator 124 are provided at a laser light output side of the resonant wave generating section 12. In this case, the Nd:YVO4 crystal 121a, the Nd:YVO4 crystal holder 121b, the KTP crystal 122a, the KTP crystal holder 122b, the reflecting mirror 123 and the actuator 124 are incorporated within a laser resonator enclosure 125.

The reflecting mirror 123 is coated so as to reflect the light with the wavelength of 1064 nm and to allow the light with the wavelength of 532 nm to pass therethrough. Therefore, the Nd:YVO4 crystal, 121a and the reflecting mirror 123 configure a resonator only for the light with the wavelength of 1064 nm.

The actuator 124 uses (or includes) a piezoelectric element and becomes deformed in response to application of voltage, whereby a position of the reflecting mirror 123 may be displaced.

In accordance with the above configuration of an optical system, the light passing through the Nd:YVO4 crystal 121a and the KTP crystal 122a becomes light L2 including wavelengths of 532 nm, 808 nm and 1064 nm. In the resonator, when the light L2 is amplified and wavelengths of the light L2 are selected, the laser light L3 of a single longitudinal mode with the wavelengths of 1064 nm and 532 nm can be obtained.

Further, even though the surface of the Nd:YVO4 crystal 121a, which is opposed to the KTP crystal 122a, and both surfaces of the KTP crystal 122a are subjected to an antireflective coating, they serve as a frequency filter so that only light with a specific frequency can pass through them.

Next, the laser light detecting section 2 will be described.

The laser light L3 generated by the laser generating section 1 is split by the laser light detecting section 2 into laser light L8, and the laser light L8 is detected by the laser light detecting section 2. The laser light detecting section 2 includes a harmonic separator 21, a λ/2 plate 22a, λ/4 plate 22b, two polarizing beam splitters 23a, 23b, an iodine cell 24, a reflecting plate 25 and a light detecting device 26.

The harmonic separator 21 splits the laser light with the wavelengths of 1064 nm and 532 nm, thereby obtaining laser light L4 with the wavelength of 1064 nm and laser light L5 with the wavelength of 532 nm.

A polarized direction of the laser light L5 with the wavelength of 532 nm is adjusted by the λ/2 plate 22a. Laser light L6 of p-polarized light then passes through the polarizing beam splitters 23a, 23b, the λ/4 plate 22b and the iodine cell 24 to be reflected by the reflecting plate 25. The laser light L6 again passes through the iodine cell 24 and the λ/4 plate 22b to reach the polarizing beam splitter 23b.

Laser light L7 of s-polarized light is reflected by the polarizing beam splitter 23a, and is utilized for length measurement. According to the configuration of the above optical system, a component with a predetermined wavelength of the p-polarized laser light L6 is absorbed by the iodine cell 24, and the p-polarized laser light L6 is converted into s-polarized light after passing through the λ/4 plate 22b twice. The converted s-polarized laser light 18 is reflected by the polarizing beam splitter 23b, and is then photoelectrically converted and detected as an optical output signal S1 by the light detecting device 26. This optical output signal S1 is utilized for a frequency stabilization control as a reference.

Next, the drive control section 3 will be described.

The drive control section 3 includes an actuator control section 31, a modulation/demodulation signal generating section 32, an actuator drive section 33, a secondary differentiation lock-in amplifier 34, a tertiary differentiation lock-in amplifier 35 and a computer 36. In this case, the computer 36 includes an automatic stabilizing section 36a and a memory 36b. The automatic stabilizing section 36a may be a central processing unit (CPU), for example. The automatic stabilizing section 36a has a function to stabilize an oscillation frequency of laser light by operating in accordance with a control program stored in the memory 36b.

The actuator control section 31 outputs output voltage S4 to start control of the actuator driving section 33.

The modulation/demodulation signal generating section 32 outputs a signal with a frequency of 1 f Hz to the actuator driving section 33, outputs a signal with a frequency of 2 f Hz to the secondary differentiation lock-in amplifier 34, and outputs a signal with a frequency of 3 f Hz to the tertiary differentiation lock-in amplifier 35.

The actuator driving section 33 operates on the basis of the signal with the frequency of 1 f Hz inputted from the modulation/demodulation signal generating section 32 to drive the actuator 124 in response to the output voltage S4 outputted from the actuator control section 31, whereby the laser light L3 is modulated.

The secondary differentiation lock-in amplifier 34 demodulates the optical output signal S1, which is obtained by pumping of the laser light L3 modulated on the basis of the signal with the frequency of 1 f Hz, with the signal with the frequency of 2 f Hz, and outputs a secondary differential signal S2 to the computer 36 (the automatic stabilizing section 36a).

The tertiary differentiation lock-in amplifier 35 demodulates the optical output signal S1, which is obtained by the pumping of the laser light L3 modulated on the basis of the signal with the frequency of 1 f Hz, with the signal with the frequency of 3 f Hz, and outputs a tertiary differential signal S3 to the actuator control section 31 and the computer 36 (the automatic stabilizing section 36a).

The automatic stabilizing section 36a outputs a control signal to the actuator control section 31 on the basis of the secondary differential signal S2 and the tertiary differential signal S3 of the optical output signal S1. The actuator control section 31 executes an operation for increase or decrease of output voltage S5 or an operation for stabilizing.

The memory 36b stores information on the secondary differential signal S2 and the tertiary differential signal S3 obtained by the automatic stabilizing section 36a therein.

(Control for Stabilizing Oscillation Frequency of Laser Frequency Stabilizing Apparatus)

Next, control for stabilizing an oscillation frequency of the laser frequency stabilizing apparatus according to the first embodiment of the present invention will be described with reference to FIGS. 2A to 9.

Figure 2C:
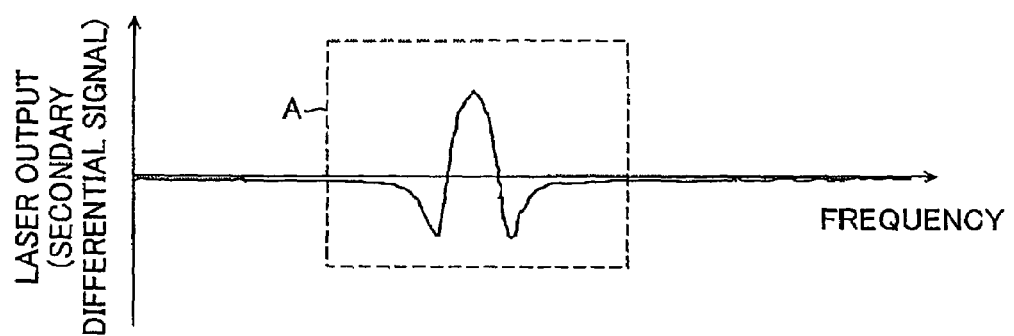
FIG. 2C is an enlarged view of an area "A" in FIG. 2A.
Figure 2D:
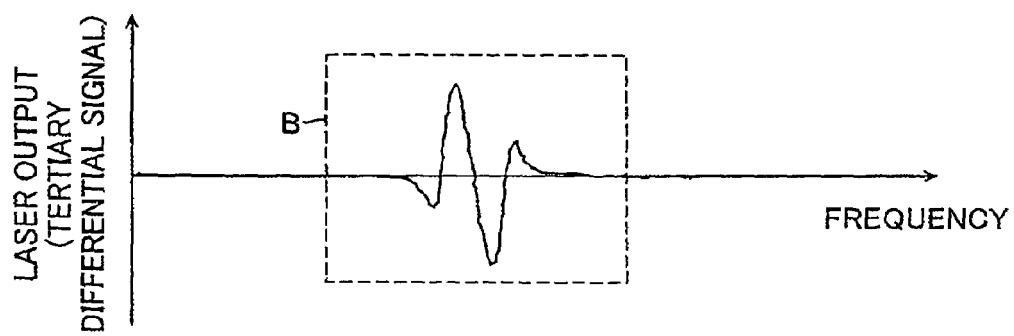
FIG. 2D is an enlarged view of an area "B" in FIG. 2B.

FIG. 2A is a diagram that shows an example of a waveform of the secondary differential signal S2 of the optical output signal S1, which is obtained when an oscillation frequency is scanned while the resonator length is changed by the laser frequency stabilizing apparatus of the first embodiment. FIG. 2B is a diagram that shows a waveform of the tertiary differential signal S3. FIG. 2C is an enlarged view of an area "A" of the secondary differential signal S2 in FIG. 2A. FIG. 2D is an enlarged view of an area "B" of the tertiary differential signal S3 in FIG. 2B. As shown in FIG. 2A, six saturated absorption line groups (reference symbols $N_1$ to $N_6$) are found in the second differential signal. Each of the saturated absorption line groups is configured from a bundle of saturated absorption lines. The number of saturated absorption lines and a combination thereof in each of the saturated absorption line groups are as follows in the order of a lower frequency to a higher frequency: one line (reference symbol $a_1$), four lines (reference symbols $a_2$ to $a_5$), four lines (reference symbols $a_6$ to $a_9$), one line (reference symbol $a_{10}$), four lines (reference symbols $a_{11}$ to $a_{14}$), and one line (reference symbol $a_{15}$). Further, as shown in FIG. 2B, the feature similar to that of the secondary differential signal is observed in the tertiary differential signal.

Figure 3A:
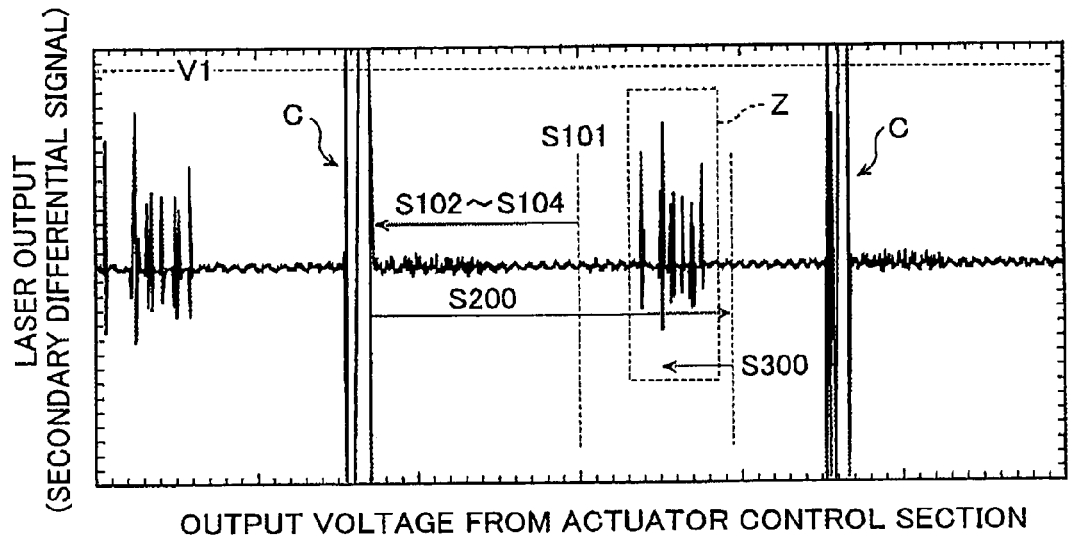
FIG. 3A is a diagram that shows a secondary differential signal detected when the laser frequency stabilizing apparatus according to the first embodiment of the present invention is controlled.
Figure 3B:
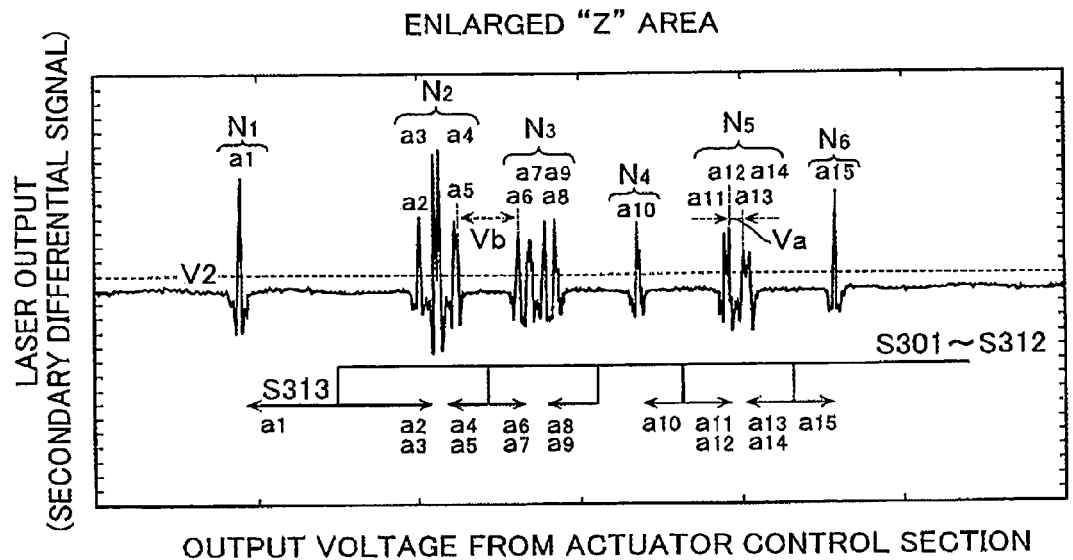
FIG. 3B is an enlarged view of an area "Z" in FIG. 3A.

FIG. 3A shows the secondary differentiation signal S2 when the actuator 124 operates in a full stroke (that is, an operation in an overall movable range). FIG. 3B shows an enlarged view of a portion "Z" of the secondly differential signal S2.

Here, the relationship between a resonator length L and a laser wavelength λ is shown as follows:

$$L = m\lambda/2 \qquad \text{(Formula 1)}$$

(where the reference symbol "L" denotes a resonator length, the reference symbol λ denotes a wavelength of the laser, and the reference symbol "m" denotes an integer)

Because of satisfying the relationship of the above Formula 1 within the resonator, an oscillation frequency varies with variation of the resonator length L. Therefore, a frequency filter for selecting a desired frequency is provided within the resonator in the first embodiment. Since a frequency range of the laser wavelength λ that can exist in the resonator is limited on the basis of the frequency filter, drastic variation of the oscillation frequency, so-called mode hopping, occurs as shown as the reference symbol "C" in FIG. 3A when the resonator length is kept to vary widely. In addition, when variation in the resonator length is kept widely, the oscillation frequency is repeated periodically.

The laser frequency stabilizing apparatus according to the first embodiment of the present invention stabilizes the oscillation frequency using the saturated absorption line groups (reference symbols $N_1$ to $N_6$), the saturated absorption lines (reference symbols $a_1$ to $a_{15}$) and mode hopping "C".

Figure 4:
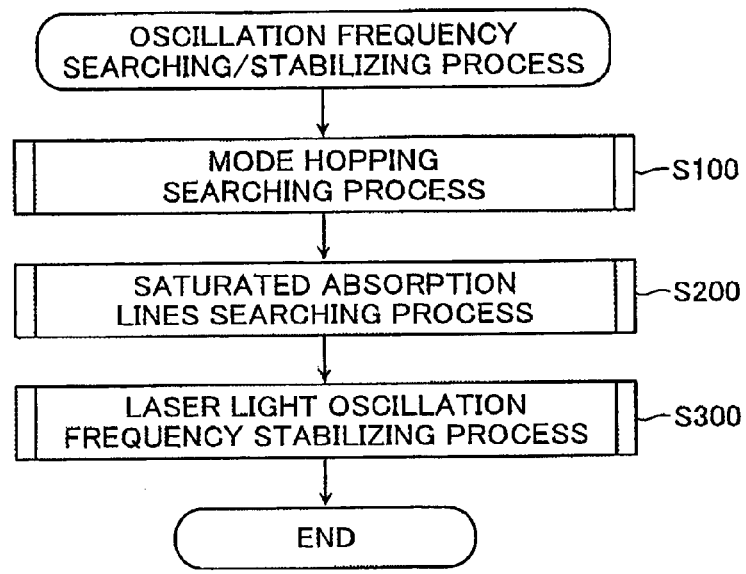
FIG. 4 is a flowchart that shows an oscillation frequency searching and stabilizing process of the laser frequency stabilizing apparatus according to the first embodiment of the present invention.

A process for searching a predetermined saturated absorption line and stabilizing the oscillation frequency of the laser light L3 at the predetermined saturated absorption line will now be described with reference to FIGS. 3A to 9. As shown in FIG. 4, the automatic stabilizing section 36a first searches the mode hopping "C" to control the output voltage S4 outputted from the actuator control section 31 so that the oscillation frequency of the laser light L8 coincides with the frequency of the mode hopping "C" (Step S100). Subsequently, the automatic stabilizing section 36a controls the output voltage S4 to search the saturated absorption lines on the basis of the secondary differential signal S2 (Step S200). The automatic stabilizing section 36a then stabilizes the oscillation frequency of the laser light L8 to a desired saturated absorption line from the searched saturated absorption lines (Step S300). Hereinafter, the process at Step S100 is called as a mode hopping searching process, the process at Step S200 is called as a saturated absorption line searching process, and the process at Step S300 is called as a laser light oscillation frequency stabilizing process.

Figure 5:
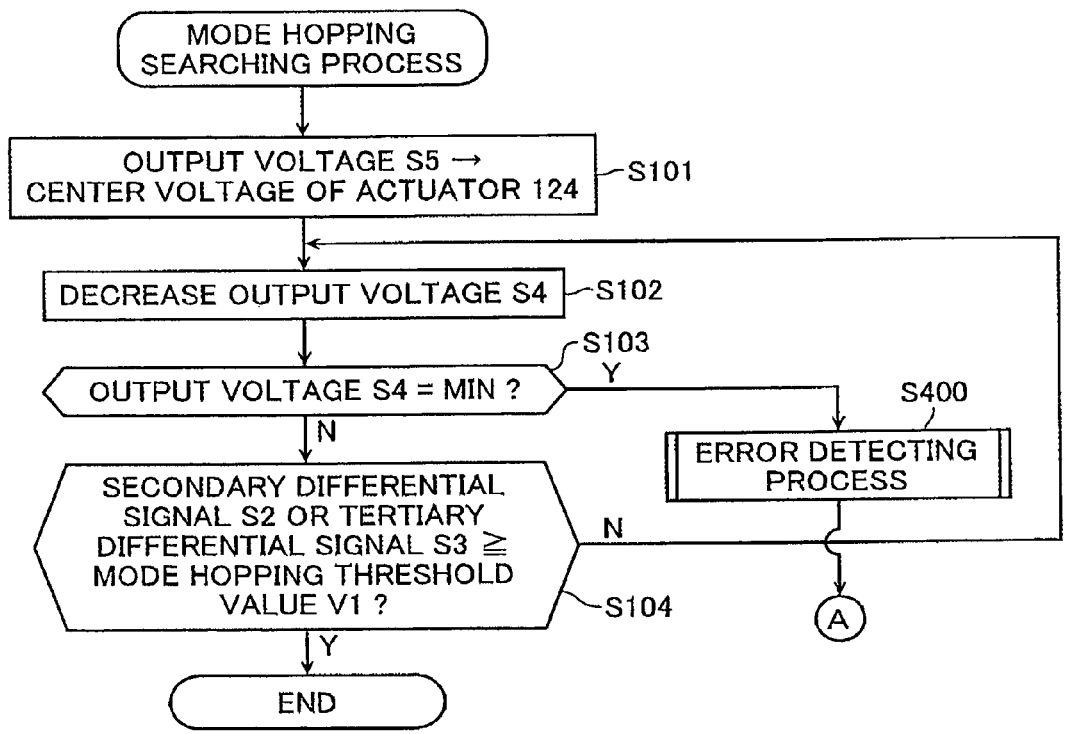
FIG. 5 is a flowchart that shows a mode hopping searching process of the laser frequency stabilizing apparatus according to the first embodiment of the present invention.

Next, the process at Step S100 described above (that is, the mode hopping searching process) will be described in detail with reference to FIG. 5. As shown in FIG. 5, the automatic stabilizing section 36a first increases or decreases the output voltage S4 so that the output voltage S5 outputted from the actuator drive section 33 becomes the center voltage of the actuator 124 (Step S101). In this regard, the center voltage of the actuator 124 indicates voltage at which the actuator 124 is positioned at the center of the overall movable range.

Subsequently, the automatic stabilizing section 36a decreases the output voltage S4 by a predetermined value (Step S102). The automatic stabilizing section 36a then determines whether the output voltage S4 becomes the minimum value or not (Step S103). Here, in the case where it is determined that the output voltage S4 becomes the minimum value ("Yes" at Step S103), the automatic stabilizing section 36a executes an error detecting process (will be described later) (Step S400). On the other hand, in the case where it is determined that the output voltage S4 does not become the minimum value ("No" at Step S103), the automatic stabilizing section 36a monitors voltage of each of the secondary differential single S2 and the tertiary differential signal S3, and determines whether or not any voltage value of the monitored secondary and tertiary differential signals S2, S3 is a mode hopping threshold value V1 or more (Step S104).

Here, in the case where it is determined that the voltage value of the secondary differential signal S2 or the tertiary differential signal S3 is less than the mode hopping threshold value V1 ("No" at Step S104), the automatic stabilizing section 36a again executes the processes from Step S102 to decrease the output voltage S4. On the other hand, in the case where it is determined that the voltage value of the secondary differential signal S2 or the tertiary differential signal S3 is the mode hopping threshold value V1 or more ("Yes" at Step S104), the automatic stabilizing section 36a terminates the mode hopping searching process.

Figure 6:
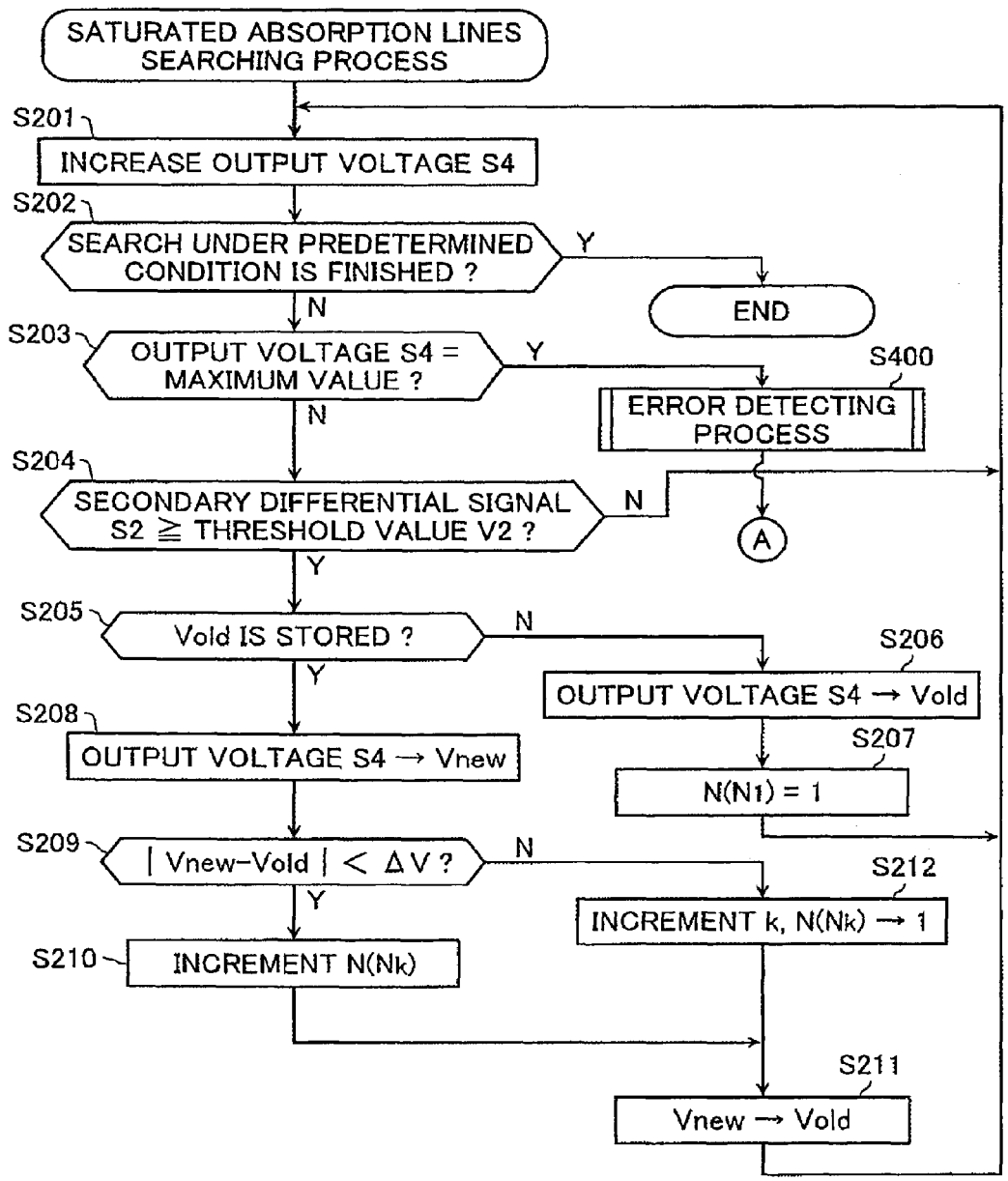
FIG. 6 is a flowchart that shows a saturated absorption lines searching process of the laser frequency stabilizing apparatus according to the first embodiment of the present invention.

Next, the process at Step S200 described above (that is, the saturated absorption line searching process) will be described in detail with reference to FIG. 6. The automatic stabilizing section 36a first increases the output voltage S4. (Step S201). Subsequently, the automatic stabilizing section 36a determines whether or not the saturated absorption line of a predetermined condition set in advance is searched (Step S202). Here, in the case where it is determined that the saturated absorption line of the predetermined condition is searched ("Yes" at Step S202), the automatic stabilizing section 36a terminates this flowchart.

On the other hand, in the case where it is determined that the saturated absorption line of the predetermined condition is not searched ("No" at Step S202), the automatic stabilizing section 36a causes the processing flow to shift to a next process. Subsequently, the automatic stabilizing section 36a determines whether or not the output voltage S4 becomes the maximum value (Step S203). Here, in the case where it is determined that the output voltage S4 becomes the maximum value ("Yes" at Step S203), the automatic stabilizing section 36a executes the error detecting process (will be described later) (Step S400).

On the other hand, in the case where it is determined that the output voltage S4 does not become the maximum value ("No" at Step S203), the automatic stabilizing section 36a then determines whether or not voltage of the secondary differential signal S2 is the threshold value V2 or more (Step S204). Namely, at Step S204, the automatic stabilizing section 36a determines whether or not the saturated absorption line is to be approved. Here, in the case where it is determined that the voltage of the secondary differential signal S2 is less than the threshold value V2 ("No" at Step S204), the automatic stabilizing section 36a again executes the processes from Step S201 to increase the output voltage S4.

On the other hand, in the case where it is determined that the voltage of the secondary differential signal S2 is the threshold value V2 or more ("Yes" at Step S204), the automatic stabilizing section 36a then determines whether or not Vold (will be described later) is stored in the memory 36b (Step S205).

Here, in the case where it is determined that the Vold is not stored in the memory 36b ("No" at Step S205), the automatic stabilizing section 36a stores the output voltage S4 as Vold in the memory 36b (Step S206). Subsequently, the automatic stabilizing section 36a stores information on "N($N_1$)=1" so as to be associated with the Vold (Step S207). In this case, in the expression "N($N_1$)=1", the reference symbol "$N_1$" denotes the saturated absorption line group first observed when the voltage is increased from a low output voltage side of the actuator control section 31. The expression "N($N_1$)=1" indicates the number of the saturated absorption lines included in the saturated absorption line group. Subsequently, the automatic stabilizing section 36a repeatedly executes the processes from Step S201.

On the other hand, in the case where it is determined at Step S205 that the Vold is stored in the memory 36b ("Yes" at Step S205), the automatic stabilizing section 36a stores the output voltage S4 as Vnew in the memory 36b (Step S208). Subsequently, the automatic stabilizing section 36a determines whether or not the relationship of Formula 2 as follows is met (Step S209).

$$|Vnew-Vold|<\Delta V \qquad \text{(Formula 2)}$$

In the case where it is determined that the relationship of the above Formula 2 is met ("Yes" at Step S209), the automatic stabilizing section 36a increments N($N_k$) (Step S210). For example, in the case of N($N_2$)=3, the automatic stabilizing section 36a sets 4 to the N($N_2$). In other words, the automatic stabilizing section 36a adds one to the number of saturated absorption lines included in the saturated absorption line group. In this case, the relationship of Formula 3 as follows is predefined for $\Delta V$.

$$Va<\Delta V<Vb \qquad \text{(Formula 3)}$$

Here, as shown in FIG. 3B, the reference symbol "Va" denotes the maximum value of a voltage difference between the saturated absorption lines in each of the saturated absorption line groups, and the reference symbol "Vb" denotes the minimum value of a voltage difference between the saturated absorption lines belonging to adjacent saturated line groups. For example, in the case of Va=0.05V and Vb=0.25V, the automatic stabilizing section 36a may define $\Delta V$=0.15V or the like.

Subsequently, the automatic stabilizing section 36a changes the Vnew into the Vold (Step S211), and executes the processes from Step S201 again.

On the other hand, in the case where it is determined that the relationship of the above Formula 2 is not met ("No" at Step S209), the automatic stabilizing section 36a increments the k to set one to the N($N_k$) (Step S212). For example, in the case of N($N_2$)=4, the automatic stabilizing section 36a sets 1 to the N($N_3$). In other words, the automatic stabilizing section 36a sets so that the approved saturated absorption line is to be included in a new saturated absorption line group. Subsequently, the automatic stabilizing section 36a executes the process at Step S211 described above. As described above, the automatic stabilizing section 36a then increases the output voltage S4. In the case where it is determined that the search of the saturated absorption lines of the predetermined condition is terminated ("Yes" at Step S202), the automatic stabilizing section 36a terminates this flowchart. In this regard, in other words about the above processes, the automatic stabilizing section 36a executes approval of the saturated absorption line group (that is, combination of the saturated absorption line) at Steps S205 to S212.

Figure 7:
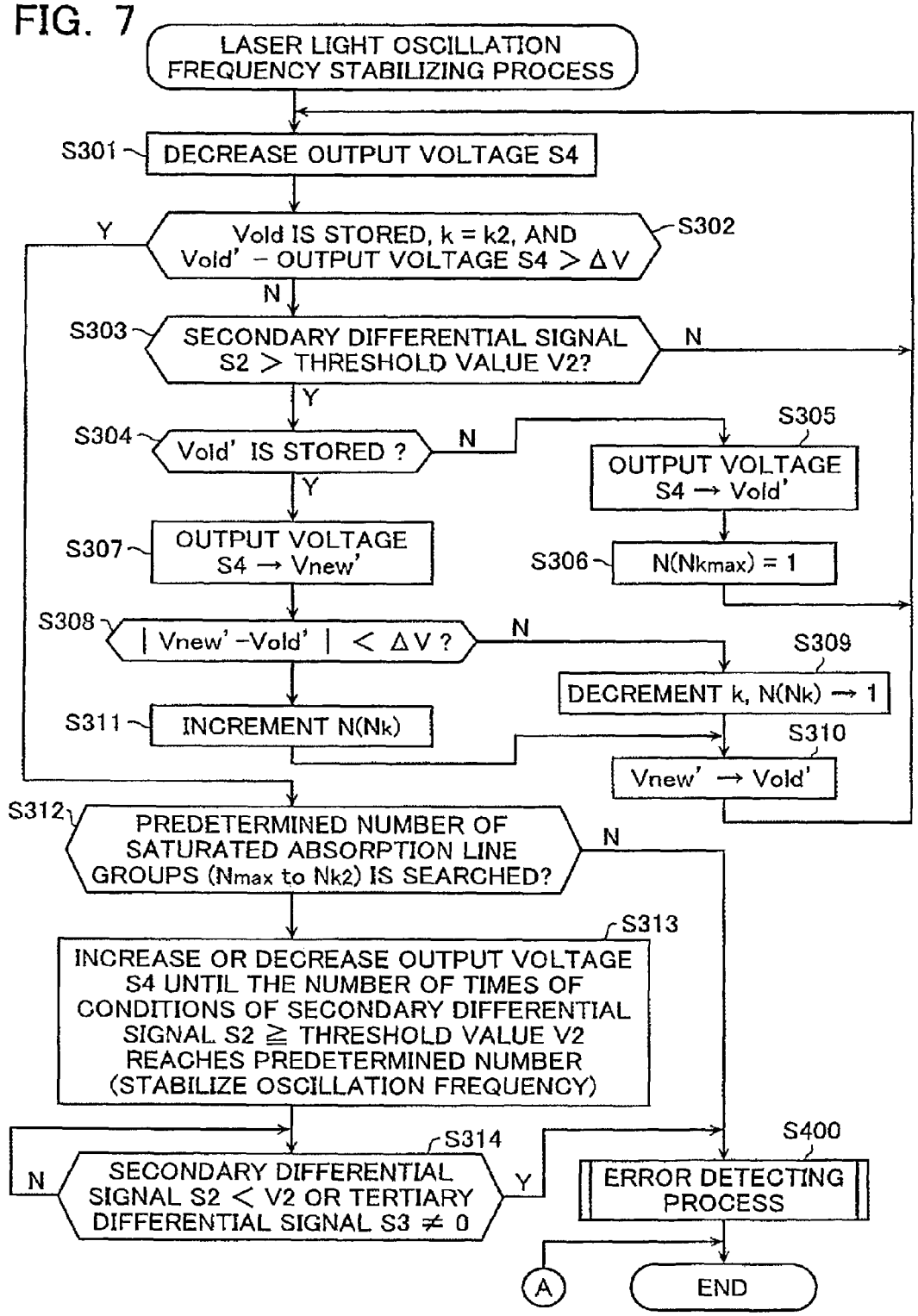
FIG. 7 is a flowchart that shows a laser light oscillation frequency stabilizing process of the laser frequency stabilizing apparatus according to the first embodiment of the present invention.

Next, the process at Step S300 described above (that is, the laser light oscillation frequency stabilizing process) will be described with reference to FIG. 7. The automatic stabilizing section 36a first decreases the output voltage S4 (Step S301). Subsequently, the automatic stabilizing section 36a determines whether or not all conditions in which the Vold' is stored in the memory 36b, k=k2, and Vold'−output voltage S4>$\Delta V$ are met (Step S302). Here, in the case where it is determined that any of the conditions at Step S302 is not met ("No" at Step S302), the automatic stabilizing section 36a determines whether or not the secondary differential signal S2 is the threshold value V2 or more (Step S303). Here, in the case where it is determined that the secondary differential signal S2 is less than the threshold value V2 ("No" at Step S303), the automatic stabilizing section 36a repeatedly executes the processes from Step S301 again.

On the other hand, in the case where it is determined that the secondary differential signal S2 is the threshold value V2 or more ("Yes" at Step S303), the automatic stabilizing section 36a determines whether or not the Vold' is stored in the memory 36b (Step S304). Here, in the case where it is determined that the Vold' is not stored in the memory 36b ("No" at Step S304), the automatic stabilizing section 36a stores the output voltage S4 as the Vold' in the memory 36b (Step S305). Subsequently, the automatic stabilizing section 36a sets one to the number of saturated absorption lines N($N_{kmax}$) of the saturated absorption line group $N_{kmax}$ at the highest output voltage side of the actuator control section 31 (Step S306). The number of saturated absorption lines N($N_{kmax}$) is obtained in the saturated absorption line searching process (Step S200). The automatic stabilizing section 36a repeatedly executes the processes from Step S301 again.

On the other hand, in the case where it is determined that the Vold' is stored in the memory 36b ("Yes" at Step S304), the automatic stabilizing section 36a stores the output voltage S4 as the Vnew' in the memory 36b (Step S307).

Subsequently, the automatic stabilizing section 36a determines whether or not the relationship of Formula 4 as follows is met (Step S308).

$$|Vnew'-Vold'|<\Delta V \qquad \text{(Formula 4)}$$

Here, in the case where it is determined that the relationship of the above Formula 4 is not met ("No" at Step S308), the automatic stabilizing section 36a decrements the k, sets 1 to the N($N_k$) (Step S309), and updates (or rewrites) the Vnew' to the Vold' (Step S310). The automatic stabilizing section 36a then repeatedly executes the processes from Step S301.

On the other hand, in the case where it is determined that the relationship of the above Formula 3 is met ("Yes" at Step S308), the automatic stabilizing section 36a increments the $N(N_k)$ (Step S311), and executes the process at Step S310 described above.

On the other hand, in the case where it is determined at Step S302 described above that all of the conditions are met ("Yes" at Step S302), the automatic stabilizing section 36a determines whether or not the predetermined number of saturated absorption line groups ($N_{max}$ to $N_{k2}$) searched in the saturated absorption line searching process (Step S200) is searched again (Step S312). In this regard, the reference symbol $N_{k2}$ is a constant corresponding to a desired saturated absorption line. Here, in the case where it is determined that the predetermined number of saturated absorption line groups is searched again ("Yes" at Step S312), the automatic stabilizing section 36a increases or decreases the output voltage S4 until the number of times of conditions that the secondary differential signal S2 is the threshold value V2 or more reaches a predetermined number (Step S313). Namely, at Step S313, the oscillation frequency of the laser light L8 is stabilized (or locked) at the desired saturated absorption line.

Figures 8, 9:
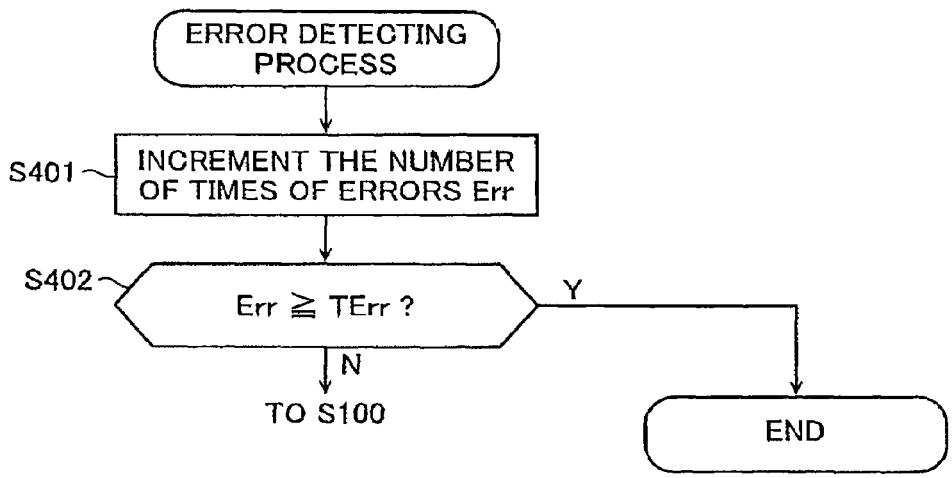
FIG. 8 is a diagram that shows various parameters used to stabilize a saturated absorption line in the laser frequency stabilizing apparatus according to the first embodiment of the present invention.
FIG. 9 is a flowchart that shows an error detecting process of the laser frequency stabilizing apparatus according to the first embodiment of the present invention.

At the stabilization of the saturated absorption line, for example, various parameters as shown in FIG. 8 are stored in the memory 36b. In the case of the example shown in FIG. 8, a designation of the saturated absorption line to be stabilized ($a_1$ to $a_{15}$), a value of k2 (2 to 6), an increase/decrease direction of the output voltage S4 at Step S313 (decrease or increase), and the predetermined number of times of conditions that the secondary differential signal 52 exceeds the threshold value V2 at Step S313 (1 or 2) are stored as the parameters. In this regard, the parameters are not limited thereto. The parameters may be set anyway in addition to the parameters shown in FIG. 8 so long as a desired saturated absorption line is searched and stabilized. For example, in the case of stabilizing at the saturated absorption line a7, the k2 may be set to 4, the increase/decrease direction may be set to a decrease direction, and the predetermined number of times may be set to 3.

After the stabilizing operation (Step S313), the automatic stabilizing section 36a monitors the secondary differential signal S2 and the tertiary differential signal S3 to determine whether or not the secondary differential signal S2 is less than the threshold voltage. V2 or whether or not the tertiary differential signal S3 is off from the vicinity of zero (Step S314). Here, in the case where it is determined that the secondary differential signal S2 is less than the threshold voltage V2 or the tertiary differential signal S3 is off from the vicinity of zero ("Yes" at Step S314), the automatic stabilizing section 36a outputs an error message indicating that the stabilization (or lock) is off, and executes the error detecting process (Step S400). In addition, in the case where it is determined at Step S312 that the predetermined number of saturated absorption lines is not searched ("No" at Step S312), the automatic stabilizing section 36a executes the error detecting process (Step S400). In this regard, in other words about the above processes, the automatic stabilizing section 36a executes the selection of the saturated absorption line at Steps S301 to S313.

Next, the process at Step S400 for executing the error detecting process will be described in detail with reference to FIG. 9. As shown in FIG. 9, the automatic stabilizing section 36a first increments the number of times of errors Err (Step S401). Subsequently, the automatic stabilizing section 36a determines whether or not the number of times of errors Err thus incremented is a threshold value TErr or more for the number of times of errors (Step S402). Here, in the case where it is determined that the number of times of errors Err is less than the threshold value TErr ("No" at Step S402), the automatic stabilizing section 36a executes the mode hopping searching process (Step S100). On the other hand, in the case where it is determined that the number of times of errors Err is the threshold value TErr or more ("Yes" at Step S402), the automatic stabilizing section 36a terminates the error detecting process as an abnormal state of the laser light L8, and also terminates the saturated absorption line searching process (Step S200) and the laser light oscillation frequency stabilizing process (Step S300).

As described above, according to the laser frequency stabilizing apparatus of the first embodiment of the present invention, since the laser frequency stabilizing apparatus has measurement accuracy capable of identifying the number of saturated absorption lines, it is possible to achieve the laser frequency stabilizing apparatus easily, and the laser frequency stabilizing apparatus can be manufactured at a low cost. In addition, since the laser frequency stabilizing apparatus has the configuration described above, it is possible to stabilize the oscillation frequency by sufficiently following the elapsed-time variation.

Further, as described above, the laser frequency stabilizing apparatus according to the first embodiment of the present invention measures the saturated absorption line once in the saturated absorption line searching process (Step S200), and measures the saturated absorption line again in the laser light oscillation frequency stabilizing process (Step S300) to stabilize the oscillation frequency. Namely, when the laser frequency stabilizing apparatus measures the saturated absorption line again, it is possible to stabilize the oscillation frequency of the laser light at the saturated absorption line that a user desires undoubtedly. Further, this makes it possible to improve accuracy of the oscillation frequency.

In this regard, in the first embodiment described above, the saturated absorption line is specified on the basis of the number of saturated absorption lines in each of the saturated absorption line groups and a combination thereof. However, the laser frequency stabilizing apparatus may be configured to simply specify the desired saturated absorption line from the number of overall saturated absorption lines (for example, 15 lines in FIGS. 3A and 3B).

Further, in FIGS. 3A and 3B, since each pair of the saturated absorption line a3 and the saturated absorption line a4, the saturated absorption line a11 and the saturated absorption line a12, the saturated absorption line a13 and the saturated absorption line a14 is substantially the same frequency to be generated as each other, two saturated absorption lines originally included may be detected as one saturated absorption line. For such a case, criterions for the saturated absorption line group may be $N(N_1)=1$, $3 \leq N(N_2) \leq 4$, $N(N_3)=4$, $N(N_4)=1$, $2 \leq N(N_5) \leq 4$ and $N(N_6)=1$.

Moreover, although the automatic stabilizing section 36a executes the approval of the saturated absorption line on the basis of the secondary differential signal, this can be detected on the basis of the tertiary differential signal.

SECOND EMBODIMENT

Next, the configuration of a laser frequency stabilizing apparatus according to a second embodiment of the present invention will now be described.

The laser frequency stabilizing apparatus according to the second embodiment has the configuration substantially similar to that in the first embodiment shown in FIG. 1. In the laser frequency stabilizing apparatus of the second embodiment, the actuator control section 31 and an overall movable range of the actuator 124 by the actuator drive section 33 are different from those in the first embodiment. Further, the function of the computer 36 (the automatic stabilizing section 36a) is different from that in the first embodiment. Moreover, a frequency filter for selecting a desired frequency set in the resonator is also different from that in the first embodiment. In this regard, in explanation for the second embodiment below, elements and processes identical with those of the first embodiment are assigned to the same reference numerals (or symbols) of the first embodiment, and descriptions thereof are omitted.

Figure 10A:
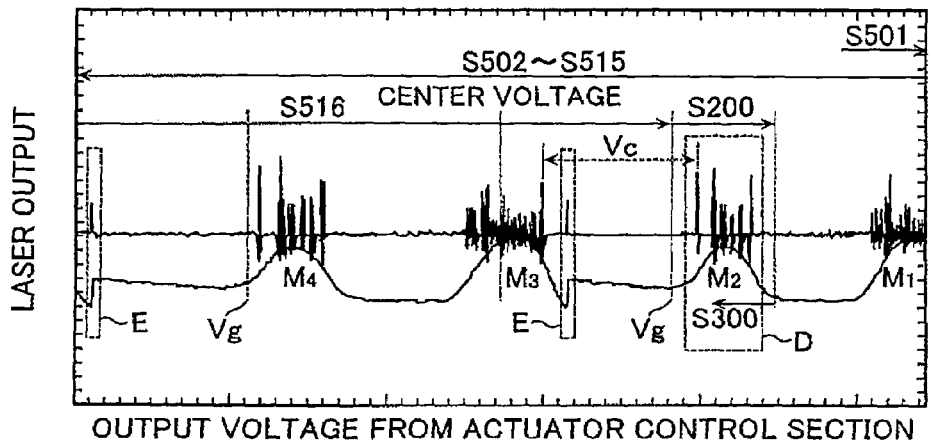
FIG. 10A is a diagram that shows an optical output signal and a secondary differential signal detected when the laser frequency stabilizing apparatus according to a second embodiment of the present invention is controlled.
Figure 10B:
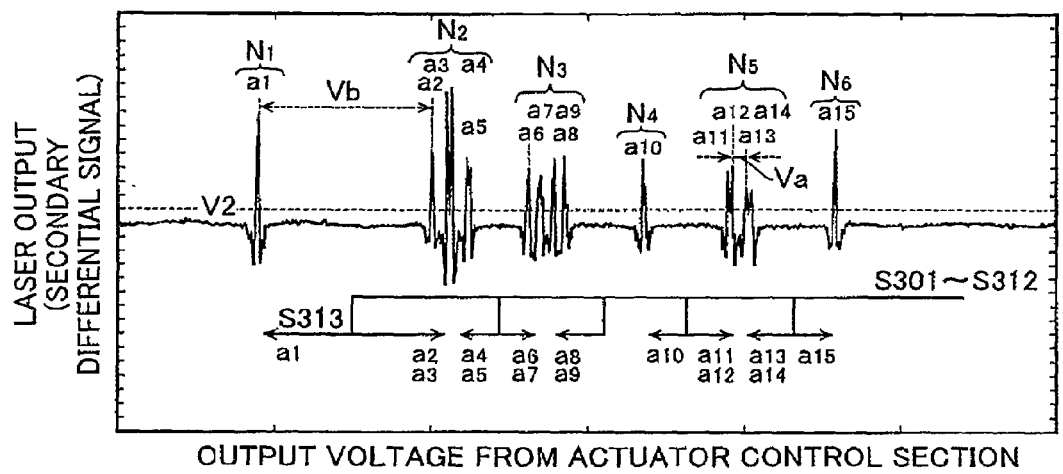
FIG. 10B is an enlarged view of an area "D" in FIG. 10A.

The secondary differential signal and the optical output signal detected when the laser frequency stabilizing apparatus according to the second embodiment is controlled will first be described with reference to FIGS. 10A and 10B. Here, FIG. 10A is a diagram that shows the secondary differential signal and the optical output signal detected when the laser frequency stabilizing apparatus according to the second embodiment of the present invention is controlled. FIG. 10B is a diagram that shows the secondary differential signal in which an area "D" of FIG. 10A is enlarged.

As shown in FIG. 10A, the laser frequency stabilizing apparatus according to the second embodiment can control the laser light with the output voltage S4 having a wider voltage value compared with that in the first embodiment (FIGS. 3A and 3B). When the output voltage S4 is scanned widely in this manner, the saturated absorption line groups (the saturated absorption lines) can be observed as a bundle to the voltage at which the absorption lines of the optical output signal S1 are observed so as to be repeated periodically. Namely, the saturated absorption lines belonging to four absorption lines $M_1$ to $M_4$ are observed within a scanning range shown in FIGS. 10A and 10B. Here, the absorption line $M_1$ and the absorption line $M_3$ are the same absorption line, and the absorption line $M_2$ and the absorption line $M_4$ are the same absorption line.

Further, as shown in FIG. 10A, mode hopping "E" is observed. In the second embodiment, a fluctuation range of the mode hopping "E" is smaller than that in the first embodiment. Namely, since the fluctuation range of the mode hopping "E" is smaller than that of the saturated absorption line, the mode hopping "E" cannot be specified as the first embodiment by setting the mode hopping threshold value V1. Thus, in the second embodiment, the process for stabilizing the oscillation frequency of the laser light is configured to be executed without searching the mode hopping "E". In this regard, the fluctuation range and the shape of the mode hopping "E" are affected by a frequency filter provided within the resonator of the second embodiment, which is different from that in the first embodiment.

Figure 11:
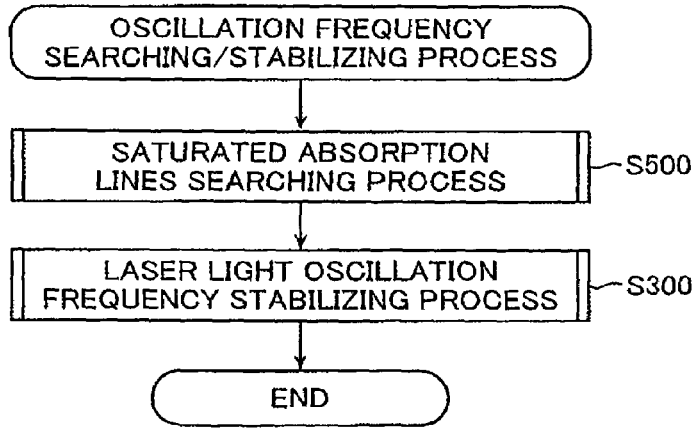
FIG. 11 is a flowchart that shows an oscillation frequency searching and stabilizing process of the laser frequency stabilizing apparatus according to the second embodiment of the present invention.

Next, the control to stabilize the oscillation frequency by means of the laser frequency stabilizing apparatus according to the second embodiment will be described with reference to FIG. 11. FIG. 11 is a flowchart that shows an oscillation frequency searching and stabilizing process of the laser frequency stabilizing apparatus according to the second embodiment. As shown in FIG. 11, the automatic stabilizing section 36a first executes the saturated absorption line searching process for searching the saturated absorption line (Step S500). The automatic stabilizing section 36a then executes the laser light oscillation frequency stabilizing process (Step S300) similar to that in the first embodiment.

Figure 12:
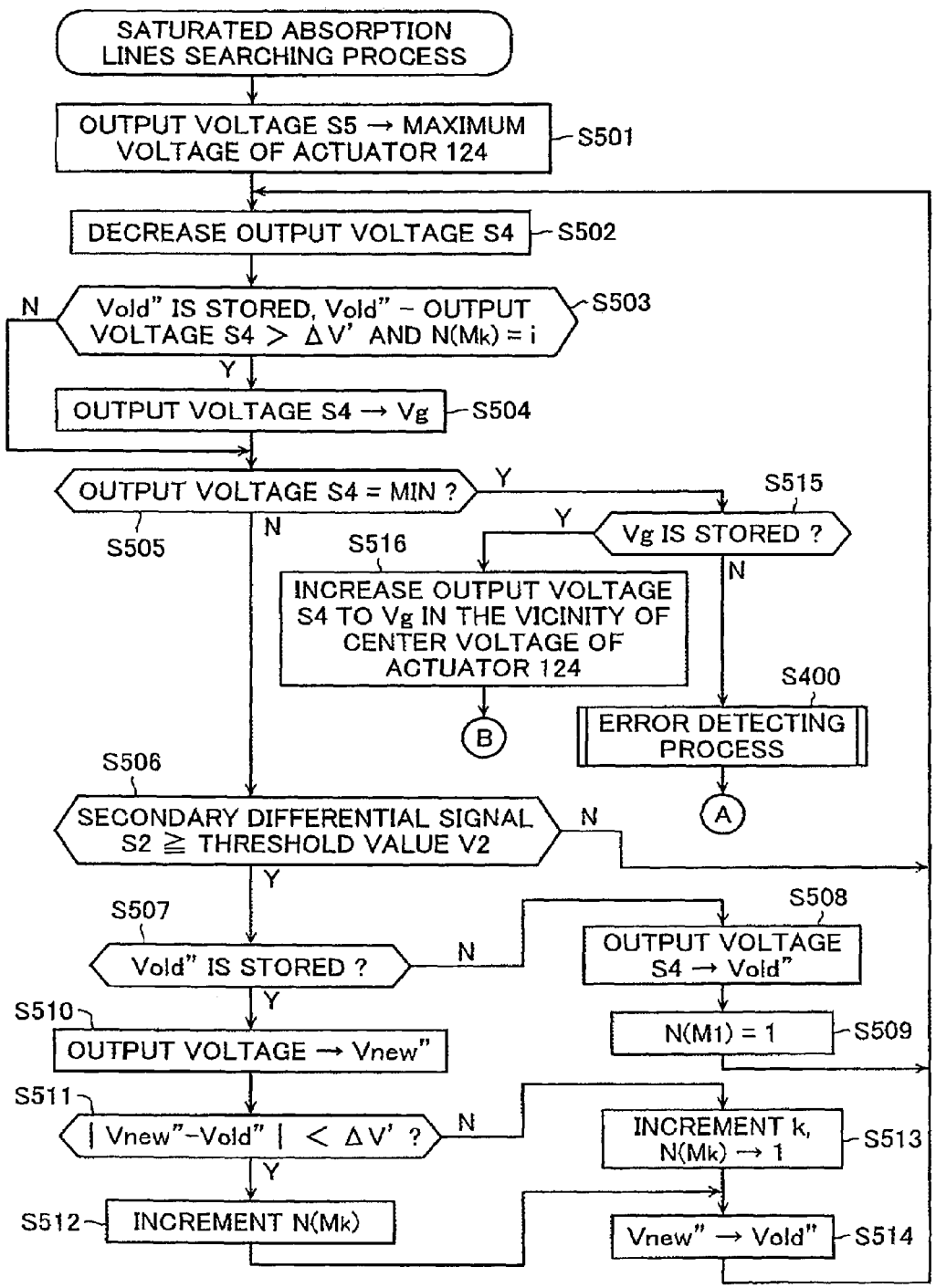
FIG. 12 is a flowchart that shows a saturated absorption lines searching process of the laser frequency stabilizing apparatus according to the second embodiment of the present invention.
Figure 13:
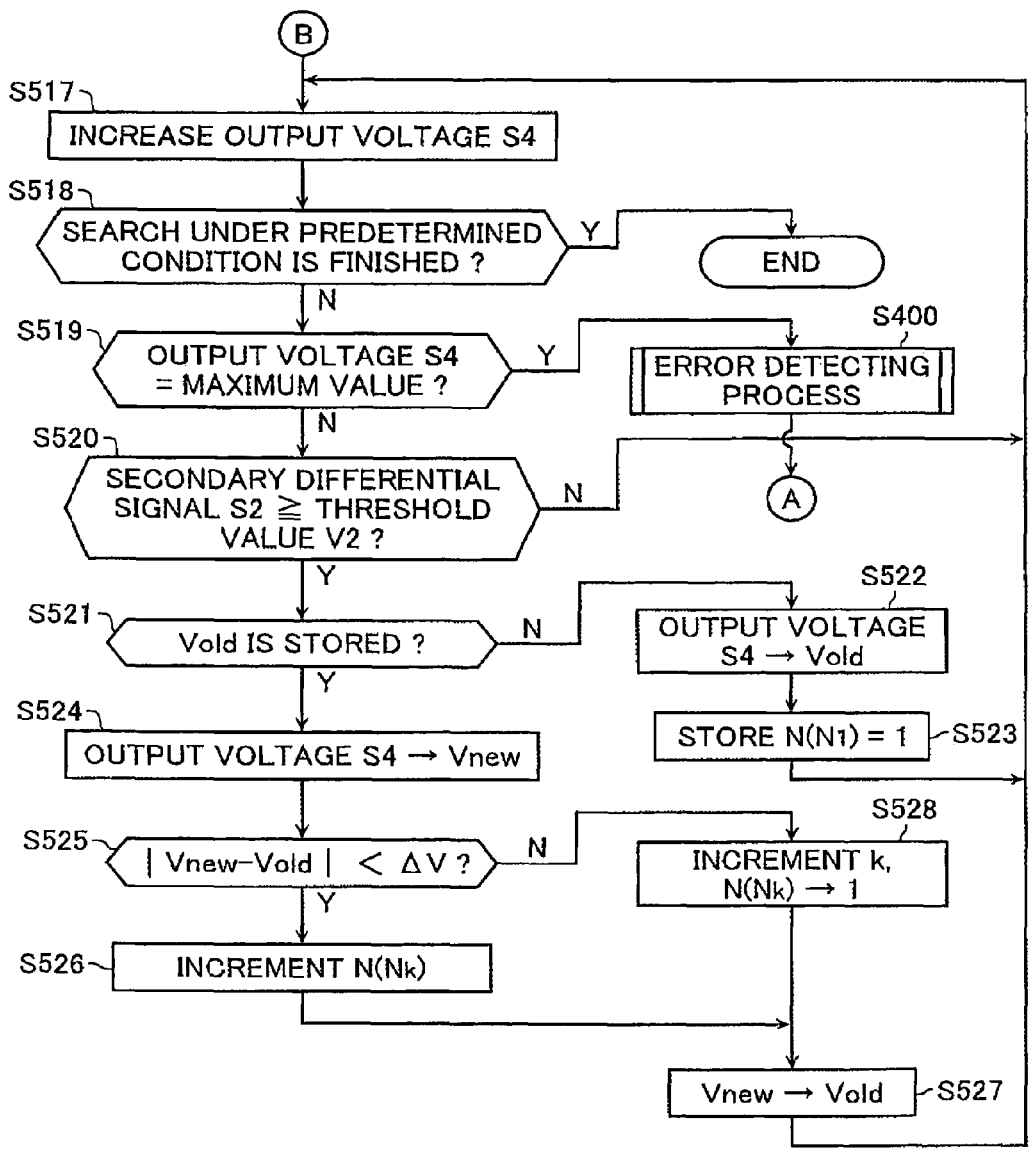
FIG. 13 is a flowchart that shows a saturated absorption lines searching process of the laser frequency stabilizing apparatus according to the second embodiment of the present invention.

Next, the saturated absorption line searching process (Step S500) in the second embodiment will be described with reference to FIGS. 12 and 13. As shown in FIG. 12, the automatic stabilizing section 36a first increases the output voltage S4 so that the output voltage S5 outputted from the actuator drive section 33 becomes the maximum voltage of the actuator 124 (Step S501). In this regard, the maximum voltage of the actuator 124 means voltage at which the movable range of the actuator 124 becomes the maximum. Subsequently, the automatic stabilizing section 36a decreases the output voltage S4 (Step S502). The automatic stabilizing section 36a then determines whether or not all conditions in which Vold" is stored in the memory 36b, Vold"−output voltage S4>ΔV', and $N(M_k)$=i are met (Step S503). Here, in the expression "$N(M_k)$=i", the reference symbol "$M_k$" denotes the saturated absorption line belonging to the absorption line observed in $k^{th}$ order when the voltage is decreased from a high output voltage side of the actuator control section 31. The expression "$N(M_k)$=i" indicates that the number of saturated absorption lines belonging to the absorption line is equal to i.

In the case where it is determined at Step S503 that all of the conditions at Step S503 are met ("Yes" at Step S503), the automatic stabilizing section 36a stores the output voltage S4 as Vg in the memory 36b (Step S504). Subsequently, the automatic stabilizing section 36a determines whether the output voltage S4 is the minimum value or not (Step S505). In this regard, in the case where it is determined at Step S503 that any of the conditions is not met ("No" at Step S503), the automatic stabilizing section 36a omits the process at Step S504 and executes the determination at Step S505.

Here, in the case where it is determined that the output voltage S4 is not the minimum value ("No" at Step S505), the automatic stabilizing section 36a determines whether or not the secondary differential signal S2 is the threshold value V2 or more (Step S506). Here, in the case where it is determined that the secondary differential signal S2 is less than the threshold value V2 ("No" at Step 506), the automatic stabilizing section 36a repeatedly executes the processes from Step S502 again.

On the other hand, in the case where it is determined that the secondary differential signal S2 is the threshold value V2 or more ("Yes" at Step S506), the automatic stabilizing section 36a determines whether or not Vold" (will be described later) is stored in the memory 36b (Step S507). Here, in the case where it is determined that the Vold" is not stored in the memory 36b ("No" at Step S507), the automatic stabilizing section 36a stores the output voltage S4 as the Vold" (Step S508). Subsequently, the automatic stabilizing section 36a stores information on "$N(M_1)$=1" so as to be associated with the voltage Vold" (Step S509). Subsequently, the automatic stabilizing section 36a repeatedly executes the processes from Step S502.

On the other hand, in the case where it is determined at Step S507 that the Vold" is stored in the memory 36b ("Yes" at Step S507), the automatic stabilizing section 36a stores the output voltage S4 as Vnew" in the memory 36b (Step S510). Subsequently, the automatic stabilizing section 36a determines whether the relationship of Formula 5 as follows is met or not (Step S511).

$$|Vnew" - Vold"| < \Delta V' \quad \text{(Formula 5)}$$

In the case where it is determined that the relationship of the above Formula 5 is met ("Yes" at Step S511), the automatic stabilizing section 36a increments the $N(M_k)$ (Step S512). For example, in the case of $N(M_2)$=3, the automatic stabilizing section 36a sets the $N(M_2)$ to 4. In other words, the automatic stabilizing section 36a adds one to the number of saturated absorption lines included in one absorption line. In this case, the relationship of Formula 6 as follows is predefined for the ΔV'.

$$Vb < \Delta V' < Vc \quad \text{(Formula 6)}$$

Here, as shown in FIGS. 10A and 10B, the reference symbol "Vb" denotes the maximum value of a voltage difference between the saturated absorption lines belonging to adjacent saturated absorption line groups, and the reference symbol "Vc" denotes the minimum value of a voltage difference between the saturated absorption lines belonging to adjacent absorption lines. For example, in the case of Vb=0.25V and Vc=5V, ΔV' may be defined as 1V or the like.

On the other hand, in the case where it is determined that the relationship of the above Formula 6 is not met ("No" at Step S511), the automatic stabilizing section 36a adds 1 to the k, whereby the N($M_k$) is set to 1 (Step S513). For example, in the case of N($M_2$)=4, the N($M_3$) may be set to 1. In other words, the approved saturated absorption line may be included in a different absorption line. Subsequently to Step S512 or S513, the automatic stabilizing section 36a sets Vnew" to the Vold" (Step S514), and repeatedly executes the processes from Step S502.

Further, in the case where it is determined at Step S505 that the output voltage S4 is the minimum voltage ("Yes" at Step S505), the automatic stabilizing section 36a determines whether or not the Vg is stored in the memory 36b (Step S515). Here, in the case where it is determined that the Vg is stored in the memory 36b ("Yes" at Step S515), the automatic stabilizing section 36a increases the output voltage S4 so that the output voltage S5 becomes the Vg in the vicinity of the center voltage of the actuator 124 (Step S516). For example, in the example shown in FIG. 10A, in the case where the absorption lines including 15 saturated absorption lines are set as a target, two absorption lines M2 and M4 that are the same as each other are observed. In this case, the output voltage S4 is increased so as to be set to the Vg of the absorption line M2 in the vicinity of the center voltage of the actuator 124.

Subsequently, the automatic stabilizing section 36a executes the processes at Steps S517 to S528 shown in FIG. 13. In this regard, since the processes at Step S517 to S528 are similar to the processes at Steps S201 to S212 of the saturated absorption line searching process (Step S200) in the first embodiment, the explanation thereof is omitted.

On the other hand, in the case where it is determined that the Vg is not stored in the memory 36b ("No" at Step S515), the automatic stabilizing section 36a executes the error detecting process similar to that in the first embodiment (Step S400).

Namely, in the saturated absorption line searching process in the second embodiment, the absorption line belonging to the saturated absorption line is determined at Step S501 to S516 by determining the output voltage S4 between the saturated absorption lines as the threshold value ΔV'. Further, the saturated absorption line group including the saturated absorption line is determined at Steps S517 to S528 by determining the output voltage 54 between the saturated absorption lines as the threshold value ΔV.

As described above, according to the laser frequency stabilizing apparatus of the second embodiment, it is possible to achieve the effects similar to those of the first embodiment. Further, according to the laser frequency stabilizing apparatus of the second embodiment, there is no need to consider a difference of the waveforms of the mode hopping due to individual variability of the apparatus. Moreover, in the case where there are a plurality of desired saturated absorption lines within the overall resonator length, it becomes robust against temperature variation because the saturated absorption line closer to the center voltage of the actuator is selected. Namely, there is no fear that the saturated absorption line having the resonator length of a narrow movable range is selected and the stabilization (or lock) thereby comes off or the like.

What is claimed is:

1. A laser frequency stabilizing apparatus for stabilizing an oscillation frequency of laser light by causing pump light to resonate using a resonator including a pair of mirrors disposed at opposed positions to generate the laser light, and varying a resonator length on the basis of a saturated absorption line included in an optical output signal, the optical output signal being obtained by irradiating an absorption cell with the laser light, the laser frequency stabilizing apparatus comprising:
    a light detecting section for detecting the optical output signal;
    a differential signal detecting section for detecting a differential signal of the optical light signal;
    an actuator for varying the resonator length;
    a drive section for driving the actuator; and
    a control section for controlling the drive section on the basis of the differential signal,
    wherein the control section determines saturated absorption lines on the basis of an output of the differential signal, derives the number of the saturated absorption lines and a combination of the determined saturated absorption lines which is configured with a bundle of saturated absorption lines from the determined saturated absorption lines, selects a specific saturated absorption line on the basis of the number of determined saturated absorption lines and the combination of the determined saturated absorption lines, and stabilizes the oscillation frequency of the laser light at the specific saturated absorption line.

2. The laser frequency stabilizing apparatus according to claim 1, wherein the control section detects the combination of the saturated absorption lines by determining a saturated absorption line group so that adjacent saturated absorption lines are included in the same saturated absorption line group in the case where a difference between control voltage values of the drive section for obtaining the adjacent saturated absorption lines is within a threshold value.

3. The laser frequency stabilizing apparatus according to claim 1, wherein the control section selects any one of the saturated absorption lines included in the combination of the saturated absorption lines in the vicinity of a center voltage value of the actuator as the specific saturated absorption line.

4. The laser frequency stabilizing apparatus according to claim 1, wherein the actuator uses a piezoelectric element.

5. The laser frequency stabilizing apparatus according to claim 1, wherein the saturated absorption lines are based on iodine molecules.

6. The laser frequency stabilizing apparatus according to claim 1, wherein the differential signal is a secondary differential signal or a tertiary differential signal of the optical output signal.

7. A method of stabilizing an oscillation frequency of laser light by causing pump light to resonate using a resonator including a pair of mirrors disposed at opposed positions to generate the laser light, and varying a resonator length on the basis of a saturated absorption line included in a differential signal of an optical output signal, the optical output signal being obtained by irradiating an absorption cell with the laser light, the method comprising:
    determining saturated absorption lines on the basis of an output of the differential signal;
    deriving the number of the saturated absorption lines and a combination of the determined saturated absorption lines which is configured with a bundle of saturated absorption lines from the determined saturated absorption lines;

selecting a specific saturated absorption line on the basis of the number of determined saturated absorption lines and a combination of the determined saturated absorption lines; and stabilizing the oscillation frequency of the laser light at the specific saturated absorption line.

8. The method according to claim 7, wherein the selecting the specific saturated absorption line includes detecting the combination of the saturated absorption lines by determining a saturated absorption line group so that adjacent saturated absorption lines are included in the same saturated absorption line group in the case where a difference between control voltage values of a drive section for obtaining the adjacent saturated absorption lines is within a threshold value.

9. The method according to claim 7, wherein the selecting the specific saturated absorption line includes selecting any one of the saturated absorption lines included in the combination of the saturated absorption lines in the vicinity of a center voltage value of an actuator for varying the resonator length as the specific saturated absorption line.

10. The method according to claim 9, wherein the actuator uses a piezoelectric element.

11. The method according to claim 7, wherein the saturated absorption lines are based on iodine molecules.

12. The method according to claim 7, wherein the differential signal is a secondary differential signal or a tertiary differential signal of the optical output signal.

13. A computer program product for stabilizing an oscillation frequency of laser light by causing pump light to resonate using a resonator including a pair of mirrors disposed at opposed positions to generate the laser light, and varying a resonator length on the basis of a saturated absorption line included in a differential signal of an optical output signal, the optical output signal being obtained by irradiating an absorption cell with the laser light, the computer program product causing a computer to execute:

determining saturated absorption lines on the basis of an output of the differential signal;

deriving the number of the saturated absorption lines and a combination of the determined saturated absorption lines which is configured with a bundle of saturated absorption lines from the determined saturated absorption lines;

selecting a specific saturated absorption line on the basis of the number of determined saturated absorption lines and a combination of the determined saturated absorption lines; and stabilizing the oscillation frequency of the laser light at the specific saturated absorption line.

14. The computer program product according to claim 13, wherein the selecting the specific saturated absorption line includes detecting the combination of the saturated absorption lines by determining a saturated absorption line group so that adjacent saturated absorption lines are included in the same saturated absorption line group in the case where a difference between control voltage values of a drive section for obtaining the adjacent saturated absorption lines is within a threshold value.

15. The computer program product according to claim 13, wherein the selecting the specific saturated absorption line includes selecting any one of the saturated absorption lines included in the combination of the saturated absorption lines in the vicinity of a center voltage value of an actuator for varying the resonator length as the specific saturated absorption line.

16. The computer program product according to claim 15, wherein the actuator uses a piezoelectric element.

17. The computer program product according to claim 13, wherein the saturated absorption lines are based on iodine molecules.

18. The computer program product according to claim 13, wherein the differential signal is a secondary differential signal or a tertiary differential signal of the optical output signal.

* * * * *